United States Patent
Nobori et al.

(10) Patent No.: US 9,630,380 B2
(45) Date of Patent: Apr. 25, 2017

(54) METHOD FOR MANUFACTURING ALUMINA SINTERED BODY AND ALUMINA SINTERED BODY

(71) Applicant: NGK INSULATORS, LTD., Nagoya (JP)

(72) Inventors: Kazuhiro Nobori, Handa (JP); Takuji Kimura, Kariya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/079,557

(22) Filed: Mar. 24, 2016

(65) Prior Publication Data

US 2016/0280604 A1    Sep. 29, 2016

(30) Foreign Application Priority Data

Mar. 26, 2015 (JP) ................. 2015-063671

(51) Int. Cl.
*C04B 35/111* (2006.01)
*B32B 18/00* (2006.01)
(Continued)

(52) U.S. Cl.
CPC ........... *B32B 18/00* (2013.01); *C04B 35/111* (2013.01); *C04B 35/62625* (2013.01); *C04B 35/62675* (2013.01); *C04B 35/62685* (2013.01); *C04B 35/634* (2013.01); *C04B 35/638* (2013.01); *C04B 2103/408* (2013.01); *C04B 2235/3206* (2013.01); *C04B 2235/3217* (2013.01); *C04B 2235/445* (2013.01);
(Continued)

(58) Field of Classification Search
CPC .................... C04B 358/10; C04B 358/111
See application file for complete search history.

(56) References Cited

U.S. PATENT DOCUMENTS 8,136,820 B2 *   3/2012   Morioka ............. H01L 21/6831
                                                     279/128
8,178,455 B2 *   5/2012   Teratani .................. B32B 18/00
                                                     501/118
(Continued)

FOREIGN PATENT DOCUMENTS

JP        2008-053316 A1    3/2008
JP        2011168472    *   9/2011

*Primary Examiner* — Karl Group
(74) *Attorney, Agent, or Firm* — Burr & Brown, PLLC

(57) ABSTRACT

A method for manufacturing an alumina sintered body, according to the present invention, includes the steps of (a) obtaining a compact by putting a slurry containing an $Al_2O_3$ powder, a MgO powder, a $MgF_2$ powder, a solvent, a dispersing agent, and a gelatinizer into a mold, gelatinizing the slurry by a chemical reaction of the gelatinizer in the mold, and causing mold release, (b) obtaining a calcined body by drying the compact, performing degreasing, and further performing calcination, and (c) obtaining a ceramic sintered body by subjecting the calcined body to hot-press firing at 1,150° C. to 1,350° C. In the step (a), the $Al_2O_3$ powder having a purity of 99.9 percent by mass or more is used and 0.1 to 0.2 parts by mass of MgO powder and 0.13 parts by mass or less of $MgF_2$ powder relative to 100 parts by mass of $Al_2O_3$ powder are used.

4 Claims, 2 Drawing Sheets

(51) Int. Cl.
*C04B 35/626* (2006.01)
*C04B 35/634* (2006.01)
*C04B 35/638* (2006.01)
*C04B 103/40* (2006.01)

(52) U.S. Cl.
CPC .............. *C04B 2235/5445* (2013.01); *C04B 2235/6023* (2013.01); *C04B 2235/72* (2013.01); *C04B 2235/77* (2013.01); *C04B 2235/784* (2013.01); *C04B 2235/786* (2013.01); *C04B 2235/96* (2013.01); *C04B 2237/343* (2013.01)

(56) References Cited

U.S. PATENT DOCUMENTS

2008/0049374 A1* 2/2008 Morioka ............. H01L 21/6831
 361/234
2010/0248935 A1* 9/2010 Teratani .................. B32B 18/00
 501/119

* cited by examiner

METHOD FOR MANUFACTURING ALUMINA SINTERED BODY AND ALUMINA SINTERED BODY

BACKGROUND OF THE INVENTION

1. Field of the Invention

The present invention relates to a method for manufacturing an alumina sintered body and an alumina sintered body.

2. Description of the Related Art

To date, electrostatic chucks may be used when semiconductor wafers are subjected to surface treatments, e.g., film formation and etching. An electrostatic chuck in which an electrostatic electrode is buried in a disc-shaped alumina substrate and one surface of the alumina substrate serves as a wafer-mounting surface is known. An electrostatic force is generated between the electrostatic electrode and the semiconductor wafer by energizing the electrostatic electrode while the semiconductor wafer is mounted on the wafer-mounting surface of the electrostatic chuck. The semiconductor wafer is attracted and held by the wafer-mounting surface on the basis of the electrostatic force. Also, a heater electrode may be buried in the alumina substrate together with the electrostatic electrode. In this case, when the heater electrode is energized while the semiconductor wafer is mounted on the wafer-mounting surface, the semiconductor wafer is heated by the heater electrode. As for the method for manufacturing the alumina substrate used for such an electrostatic chuck, a method described in PTL 1 is known. According to PTL 1, initially, a slurry containing an alumina powder having a purity of 99.7%, a small amount of MgO raw material powder, a binder, water, and a dispersing agent is produced. Subsequently, the slurry is spray-dried, and the binder is removed at 500° C. so as to produce alumina granules. The resulting alumina granules are filled into a mold, and press forming is performed to produce a compact. The resulting compact is set into a carbon sheath and hot-press firing is performed so as to produce an alumina sintered body. The hot-press firing is performed by holding the compact in a nitrogen atmosphere (150 kPa) at 1,600° C. for 2 hours while a pressure of 100 kg/cm$^2$ is applied, for example. The thus obtained alumina sintered body is subjected to grinding so as to produce the alumina substrate.

CITATION LIST

Patent Literature

PTL 1: JP 2008-53316 A

SUMMARY OF THE INVENTION

However, in the prior art electrostatic chuck described above, there is a problem that variations in release response at high temperatures are large. It is known that the release response correlates with the volume resistivity and the withstand voltage. Therefore, development of an alumina sintered body having volume resistivity at high temperatures and withstand voltage higher than ever and exhibiting small lot-to-lot variations in volume resistivity and withstand voltage has been desired.

The present invention was made in order to solve such issues and a main object is to provide an alumina sintered body having high volume resistivity at high temperatures and high withstand voltage and exhibiting small lot-to-lot variations in volume resistivity and withstand voltage.

A method for manufacturing an alumina sintered body, according to the present invention, includes the steps of:

(a) obtaining a compact by putting a slurry containing an $Al_2O_3$ powder, a MgO powder, a $MgF_2$ powder, a solvent, a dispersing agent, and a gelatinizer into a mold, gelatinizing the slurry by a chemical reaction of the gelatinizer in the mold, and causing mold release, (b) obtaining a calcined body by drying the compact, performing degreasing, and further performing calcination, and (c) obtaining a ceramic sintered body by subjecting the calcined body to hot-press firing at 1,150° C. to 1,350° C., wherein in the step (a), the $Al_2O_3$ powder having a purity of 99.9 percent by mass or more is used and 0.1 to 0.2 parts by mass of the MgO powder and 0.13 parts by mass or less of the $MgF_2$ powder relative to 100 parts by mass of the $Al_2O_3$ powder are used in preparation of the slurry.

According to the method for manufacturing an alumina sintered body, it is possible to obtain an alumina sintered body having high volume resistivity at high temperatures and high withstand voltage and exhibiting small lot-to-lot variations in volume resistivity and withstand voltage. Such an alumina sintered body is obtained because the amounts of addition of the $MgF_2$ powder, which functions as a sintering aid, and the MgO powder, which functions as a grain growth inhibitor, to the slurry are within appropriate ranges. If the amount of the $MgF_2$ powder is too large, the grain size becomes too large and degradation of the characteristics is caused. If the amount of the $MgF_2$ powder is too small, sintering does not proceed easily. If the amount of the MgO powder is too small, the grain size becomes too large and degradation of the characteristics is caused. If the amounts of the MgO powder and the $MgF_2$ powder are too large, different phases ($MgAl_2O_4$ and the like) having relatively high electrical conductivity are generated in alumina and, thereby, the volume resistivity decreases. Meanwhile, the volume resistivity at high temperatures and the withstand voltage of the alumina sintered body obtained by this method are stable irrespective of lot. The characteristics are stable because a so-called gel casting method (method in which forming of slurry is performed by gelatinization) is adopted, so that the $Al_2O_3$ powder, the $MgF_2$ powder, and the MgO powder are easily homogeneously dispersed.

In this regard, in consideration of the release response at high temperatures, it is preferable that the volume resistivity at 400° C. of the alumina sintered body be 1.0×10$^{15}$ Ω·cm or more and the withstand voltage be 130 kV/mm or more. The average grain size is preferably 0.5 to 10 µm. It is preferable that 3σ (σ represents a standard deviation) of the grain size be 1 to 20 µm. It is preferable that the composition contain 0.09 to 0.17 percent by mass of Mg element and 0.03 to 0.04 percent by mass of F element. The manufacturing method according to the present invention is suitable for production of such an alumina sintered body.

DETAILED DESCRIPTION OF THE INVENTION

Figure 1:
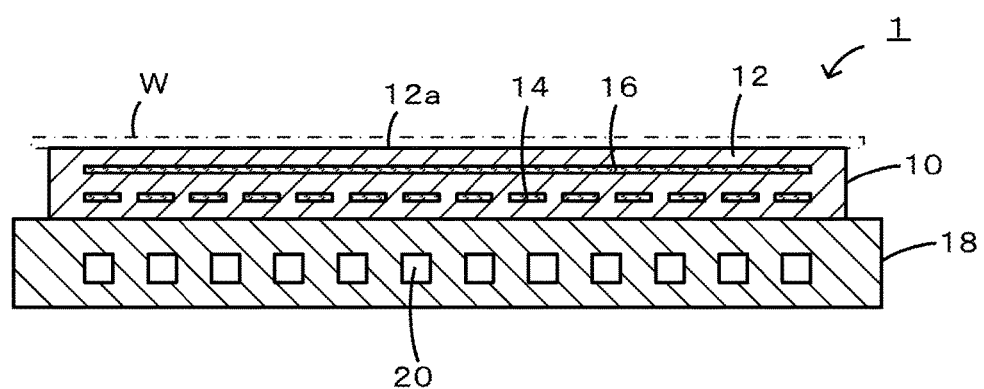
FIG. 1 is a sectional view of a member 1 for a semiconductor production apparatus.

The preferred embodiment according to the present invention will be described below with reference to the drawings. FIG. 1 is a sectional view of a member 1 for a semiconductor production apparatus.

The member 1 for a semiconductor production apparatus includes an electrostatic chuck 10, which can attract a silicon wafer W to be subjected to a plasma treatment, and a cooling plate 18 serving as a support disposed on the back surface of the electrostatic chuck 10.

The electrostatic chuck 10 includes a disc-shaped alumina substrate 12 and a heater electrode 14 and an electrostatic electrode 16 which are buried in the alumina substrate 12. The upper surface of the alumina substrate 12 is a wafer-mounting surface 12a. The heater electrode 14 is, for example, patterned unicursally in such a way that wiring can be performed on the entire surface of the alumina substrate 12, and generates heat by application of a voltage so as to heat the wafer W. The heater electrode 14 is a mixture of molybdenum and alumina. A voltage can be applied to the heater electrode 14 by bar terminals (not shown in the drawing) which reach one end and the other end of the heater electrode 14 from the back of the cooling plate 18. The electrostatic electrode 16 is a planar electrode, which can be applied with a direct current voltage by an external power supply not shown in the drawing. When a direct current voltage is applied to the electrostatic electrode 16, the wafer W is attracted and fixed to the wafer-mounting surface 12a by a Coulomb force or Johnson-Rahbek force. When the application of the direct current voltage is stopped, the attraction and fixing of the wafer W to the wafer-mounting surface 12a are released.

The cooling plate 18 is a metal (for example, aluminum) disc member and is bonded to the surface opposite to the wafer-mounting surface 12a of the electrostatic chuck 10 with a bonding layer, although not shown in the drawing, therebetween. The cooling plate 18 has a coolant channel 20, through which a coolant (for example, water) cooled by an external cooler, although not shown in the drawing, is circulated. For example, the coolant channel 20 is formed unicursally in such a way that the coolant passes throughout the cooling plate 18.

Next, an application example of the thus configured member 1 for a semiconductor production apparatus will be described. The member 1 for a semiconductor production apparatus is disposed in a chamber, although not shown in the drawing, and is used for etching the surface of the wafer W by the plasma generated in the chamber. At this time, the temperature of the wafer W is controlled to be constant by adjusting the amount of electric power supplied to the heater electrode 14 or adjusting the flow rate of the coolant circulated through the coolant channel 20 in the cooling plate 18.

Next, a procedure for producing the electrostatic chuck 10 constituting the member 1 for a semiconductor production apparatus will be described. In the following description, a procedure for producing the alumina substrate 12 will be explained in addition to the explanation of the procedure for producing the electrostatic chuck 10.

Figure 2A:
FIGS. 2A to 2D are step diagrams showing a procedure for producing an electrostatic chuck 10.

1. Production of Compact (Refer to FIG. 2A, an Example of the step (a) According to the Present Invention)

First to third compacts 51 to 53 are produced. The compacts 51 to 53 are produced by putting a slurry containing an $Al_2O_3$ powder, a MgO powder serving as a grain growth inhibitor, a $MgF_2$ powder serving as a sintering aid, a solvent, a dispersing agent, and a gelatinizer into each of molds (first to third molds), gelatinizing the slurry by a chemical reaction of the gelatinizer in the mold, and causing mold release.

There is no particular limitation regarding what material may be used for the solvent as long as the dispersing agent and the gelatinizer are dissolved. Examples of the solvent include hydrocarbon solvents (toluene, xylene, solvent naphtha, and the like), ether solvents (ethylene glycol monoethyl ether, butyl carbitol, butyl carbitol acetate, and the like), alcohol solvents (isopropanol, 1-butanol, ethanol, 2-ethylhexanol, terpineol, ethylene glycol, glycerin, and the like), ketone solvents (acetone, methyl ethyl ketone, and the like), ester solvents (butyl acetate, dimethyl glutarate, triacetin, and the like), and polybasic acid solvents (glutaric acid and the like). In particular, it is preferable that solvents having at least two ester bonds, e.g., polybasic acid esters (dimethyl glutarate and the like) and acid esters of polyhydric alcohols (triacetin and the like), be used.

There is no particular limitation regarding what material may be used for the dispersing agent as long as the $Al_2O_3$ powder is homogeneously dispersed into the solvent. Examples of the dispersing agent include polycarboxylic acid copolymers, polycarboxylates, sorbitan fatty acid esters, polyglycerol fatty acid esters, phosphate ester salt copolymers, sulfonate copolymers, and polyurethane polyester copolymers having tertiary amines. In particular, it is preferable that polycarboxylic acid copolymers and polycarboxylates be used. The dispersing agent is added and, thereby, the slurry before forming can have low viscosity and, in addition, high fluidity.

The gelatinizer may contain, for example, isocyanates, polyols, and a catalyst. There is no particular limitation regarding what material may be used for the isocyanates, among them, as long as the material has an isocyanate group as a functional group. Examples of the isocyanates include tolylene diisocyanate (TDI), diphenylmethane diisocyanate (MDI), and modified products thereof. In this regard, a reactive functional group other than the isocyanate group may be contained in the molecule, and further, a large number of reactive functional groups may be contained, as in polyisocyanates. There is no particular limitation regarding what material may be used for the polyols as long as the material has at least two hydroxyl groups which can react with isocyanate groups. Examples of the polyols include ethylene glycol (EG), polyethylene glycol (PEG), propylene glycol (PG), polypropylene glycol (PPG), polytetramethylene glycol (PTMG), polyhexamethylene glycol (PHMG), and polyvinyl alcohol (PVA). There is no particular limitation regarding what material may be used for the catalyst as long as the catalyst facilitates an urethane reaction between the isocyanates and the polyols. Examples of the catalyst include triethylenediamine, hexanediamine, and 6-dimethylamino-1-hexanol.

In this step, preferably, the solvent and the dispersing agent are added to the $Al_2O_3$ powder, the MgO powder, and the $MgF_2$ powder at a predetermined ratio, these are mixed for a predetermined time so as to prepare a slurry precursor, the gelatinizer is added to the resulting slurry precursor, and mixing and vacuum degassing are performed so as to produce the slurry. The $Al_2O_3$ powder having a purity of 99.9 percent by mass or more is used and 0.1 to 0.2 parts by mass of MgO powder and 0.13 parts by mass or less (preferably 0.09 to 0.13 parts by mass) of $MgF_2$ powder relative to 100 parts by mass of $Al_2O_3$ powder are used. There is no particular limitation regarding what mixing method may be used for preparing the slurry precursor and the slurry. For example, ball milling, rotary and revolutionary agitation, vibratory agitation, propeller agitation, and the like can be used. In this regard, preferably, the slurry, in which the gelatinizer is added to the slurry precursor, is poured into the mold promptly because the chemical reaction (urethane reaction) of the gelatinizer starts with a lapse of time. The slurry poured into the mold gels by the chemical reaction of the gelatinizer contained in the slurry. The chemical reaction of the gelatinizer refers to a reaction in which the isocyanates and the polyols are converted to urethane resins (polyurethanes) by the urethane reaction. The slurry gels by the reaction of the gelatinizer and the urethane resin functions as an organic binder.

Figure 2B:
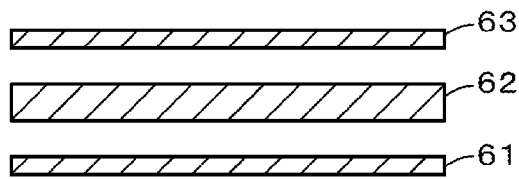

2. Production of Calcined Body (Refer to FIG. 2B, an Example of the Step (b) According to the Present Invention)

After the first to third compacts 51 to 53 are dried, degreasing and, in addition, calcination are performed so as to obtain first to third calcined bodies 61 to 63. The drying of the compacts 51 to 53 is performed in order to vaporize the solvent contained in the compacts 51 to 53. The drying temperature and the drying time may be set appropriately in accordance with the solvent used. However, the drying temperature is set with attention not to cause cracking in the compacts 51 to 53 during drying. Meanwhile, the atmosphere may be any one of an air atmosphere, an inert atmosphere, and a vacuum atmosphere. Degreasing of the compacts 51 to 53 after drying is performed in order to decompose and remove organic materials, e.g., the dispersing agent, the catalyst, and the binder. The degreasing temperature may be set appropriately in accordance with the type of the contained organic material and may be set at 400° C. to 600° C. The atmosphere may be any one of an air atmosphere, an inert atmosphere, and a vacuum atmosphere. Calcination of the compacts 51 to 53 after degreasing is performed in order to enhance the strength and facilitate handling. The calcination temperature is not specifically limited but may be set at, for example, 750° C. to 900° C. The atmosphere may be any one of an air atmosphere, an inert atmosphere, and a vacuum atmosphere.

Figure 2C:
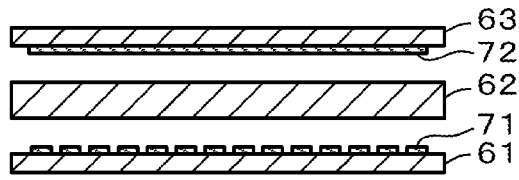

3. Printing of Electrode Paste (Refer to FIG. 2C)

One surface of the first calcined body 61 is printed with a heater electrode paste 71 in a predetermined heater electrode pattern, and one surface of the third calcined body 63 is printed with an electrostatic electrode paste 72 in a predetermined electrostatic electrode pattern. Both the pastes 71 and 72 contain an alumina powder and a molybdenum powder. Examples of the binder include cellulose binders (ethyl cellulose and the like), acrylic binders (polymethyl methacrylate and the like), and vinyl binders (polyvinyl butyral and the like). Examples of the solvent include terpineol. Examples of the printing method include a screen printing method.

Figure 2D:
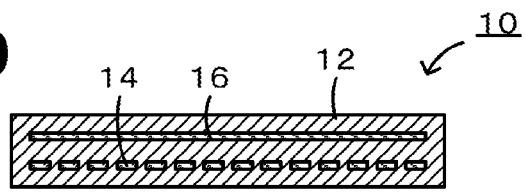

4. Hot-Press Firing (Refer to FIG. 2D, an Example of the Step (c) According to the Present Invention)

The first calcined body 61 and the second calcined body 62 are stacked with the printed heater electrode paste 71 therebetween and, in addition, the second calcined body 62 and the third calcined body 63 are stacked with the printed electrostatic electrode paste 72 therebetween. Hot-press firing is performed in that state. Consequently, the heater electrode paste 71 is made into the heater electrode 14 by firing, the electrostatic electrode paste 72 is made into the electrostatic electrode 16 by firing, and the individual calcined bodies 61 to 63 are integrated into the alumina substrate 12 by sintering, so that the electrostatic chuck 10 is obtained. In the hot-press firing, the press pressure is specified to be preferably 30 to 300 kgf/cm² at least at a maximum temperature (firing temperature), and more preferably 50 to 250 kgf/cm². In this regard, the maximum temperature may be set at a low temperature (1,150° C. to 1,350° C.) as compared with the case where the MgF$_2$ powder is not added because the MgF$_2$ powder serving as the sintering aid is added to the Al$_2$O$_3$ powder. The atmosphere may be selected appropriately among an air atmosphere, an inert atmosphere, and a vacuum atmosphere. In this regard, it is not desirable to set the maximum temperature at lower than 1,150° C. because sintering of the Al$_2$O$_3$ powder does not proceed sufficiently. It is not desirable to set the maximum temperature at higher than 1,350° C. because alumina sintered grains become excessively large and various characteristics are degraded.

In the present embodiment described in detail above, the resulting alumina substrate 12 has high volume resistivity at high temperatures and high withstand voltage. Such an alumina substrate 12 is obtained because the amounts of addition of the MgF$_2$ powder which functions as the sintering aid and the MgO powder which functions as the grain growth inhibitor in the slurry are within appropriate ranges. Also, the volume resistivity at high temperatures and the withstand voltage of the thus obtained alumina substrate 12 are stable irrespective of lot. The characteristics are stable because a so-called gel casting method (method in which forming of slurry is performed by gelatinization) is adopted, so that the Al$_2$O$_3$ powder, the MgO powder, and the MgF$_2$ powder are easily homogeneously dispersed.

In consideration of the release response at high temperatures, preferably, the volume resistivity at 400° C. of the alumina sintered body 12 is $1.0 \times 10^{15}$ Ω·cm or more and the withstand voltage is 130 kV/mm or more. The average grain size is preferably 0.5 to 10 μm. It is preferable that 3σ (σ represents a standard deviation) of the grain size be 1 to 20 μm. It is preferable that the composition contain 0.09 to 0.17 percent by mass of Mg element and 0.03 to 0.04 percent by mass of F element. The above-described manufacturing method is suitable for production of such an alumina sintered body 12.

In this regard, needless to say, the present invention is not limited to the above-described embodiment and can be executed in various forms within the technical scope of the present invention.

For example, in the above-described embodiment, the electrostatic chuck 10 in which the heater electrode 14 and the electrostatic electrode 16 are buried in the alumina substrate 12 is shown. However, only one of the heater electrode 14 and the electrostatic electrode 16 may be buried in the alumina substrate 12, or a high frequency electrode for plasma generation may be buried in place of or in addition to them.

In the above-described embodiment, one surface of the first calcined body 61 is printed with the heater electrode paste 71, one surface of the third calcined body 63 is printed with the electrostatic electrode paste 72 and, thereafter, the first to third calcined bodies 61 to 63 in the stacked state are subjected to hot-press firing. However, the following procedure may be adopted. That is, one surface of the first compact 51 is printed with the heater electrode paste, and one surface of the third compact 53 is printed with the electrostatic electrode paste 72. Subsequently, the first to third compacts 51 to 53 are dried, degreased, and further calcined so as to produce the first to third calcined bodies. Thereafter, these may be stacked and subjected to hot-press firing.

In the above-described embodiment, an example of the method for manufacturing the electrostatic chuck 10 is shown. However, the method may applied to a method for manufacturing an alumina substrate with no built-in electrode, where the heater electrode 14 and the electrostatic electrode 16 are not included. In that case, three calcined bodies may be stacked and subjected to hot-press firing, or only one compact may be subjected to drying, degreasing, and calcination and, thereafter, may be subjected to hot-press firing so as to produce the alumina substrate.

EXAMPLES

The examples according to the present invention will be described below. In this regard, the following examples do not limit the present invention.

Experimental Example 1

An electrostatic chuck 10 was produced as described below in conformity with the above-described production procedure (refer to FIGS. 2A-2D).

(a) Production of Compact

A slurry precursor was prepared by weighing 100 parts by mass of $Al_2O_3$ powder (average grain size of 0.5 μm and purity of 99.99%), 0.1 parts by mass of MgO powder, 0.09 parts by mass of $MgF_2$ powder, 3 parts by mass of polycarboxylic acid copolymer serving as the dispersing agent, and 20 parts by mass of polybasic acid ester serving as the solvent and mixing them for 14 hours with a ball mill (trommel). A slurry was obtained by adding the gelatinizer, that is, 3.3 parts by mass of 4,4'-diphenylmethane diisocyanate as the isocyanates, 0.3 parts by mass of ethylene glycol as the polyols, and 0.1 parts by mass of 6-dimethylamino-1-hexanol as the catalyst, to the resulting slurry precursor and performing mixing for 12 minutes with a rotary and revolutionary agitator. The resulting slurry was poured into each of the first to third molds used in the above-described embodiment. Thereafter, standing at 22° C. for 2 hours was performed. The slurry was gelatinized on the basis of a chemical reaction of the gelatinizer in each mold and was released from the mold. In this manner, the first to third compacts 51 to 53 (refer to FIG. 2A) were obtained from the first to third molds, respectively.

(b) Production of Calcined Body

The first to third calcined bodies 61 to 63 (refer to FIG. 2B) were obtained by drying the first to third compacts 51 to 53 at 100° C. for 10 hours, performing degreasing at a maximum temperature of 550° C. for 1 hour in an air atmosphere, and further performing calcination at a maximum temperature of 820° C. for 1 hour in an air atmosphere.

(c) Printing of Electrode Paste

An electrode paste was produced by preparing a molybdenum powder and an $Al_2O_3$ powder in such a way that the alumina content became 10 percent by mass, adding polymethylmethacrylate serving as the binder and terpineol serving as the solvent, and performing mixing. The resulting electrode paste was used for both the electrostatic electrode and the heater electrode. Then, one surface of the first calcined body 61 was screen-printed with the heater electrode paste 71 and one surface of the third calcined body 63 was screen-printed with the electrostatic electrode paste 72 (refer to FIG. 2C).

(d) Hot-Press Firing

The first and second calcined bodies 61 and 62 were stacked with the heater electrode paste 71 therebetween and, in addition, the second and third calcined bodies 62 and 63 were stacked with the electrostatic electrode paste 72 therebetween. Subsequently, hot-press firing was performed in that state. Consequently, the heater electrode paste 71 was made into the heater electrode 14 by firing, the electrostatic electrode paste 72 was made into the electrostatic electrode 16 by firing, and the individual calcined bodies 61 to 63 were integrated into the alumina substrate 12 by sintering (refer to FIG. 2D). The hot-press firing was performed by conducting holding for 2 hours in a vacuum atmosphere at a pressure of 250 $kgf/cm^2$ and a maximum temperature of 1,260° C. Thereafter, the ceramic sintered body surface was subjected to surface grinding with a diamond wheel, so that the thickness from the electrostatic electrode 16 to the wafer-mounting surface 12a was specified to be 350 μm and the thickness from the heater electrode 14 to the other surface was specified to be 750 μm. Subsequently, side surface processing and perforation ware performed and terminals were attached, so that the electrostatic chuck 10 with built-in heater electrode 14 and electrostatic electrode 16 and a diameter of 300 mm was obtained.

The following characteristics of the alumina substrate 12 in the resulting electrostatic chuck 10 were measured. The results thereof are shown in Table 1. In this regard, as for sane characteristics, aluminum test pieces (without electrode) were produced separately in the same production procedure as in Experimental example 1.

Relative Density

It is assumed that all the individual raw materials ($Al_2O_3$, MgO, and $MgF_2$) mixed at the time of the production remain in the alumina sintered body while keeping their original forms, and the theoretical density of the sintered body is determined from the theoretical densities of the individual raw materials and the amounts of use (parts by mass) of the individual raw materials. Thereafter, the bulk density determined by the Archimedes method is divided by the theoretical density of the sintered body, the quotient is multiplied by 100, and the resulting value is taken as the relative density (%) of the sintered body. Therefore, if the amounts of use of the individual raw materials are not changed, the relative density increases as the bulk density increases.

Strength

A four-point bending test was performed in conformity with JIS R1601, and the strength was calculated.

Average Grain Size and 3σ

A linear analysis was employed for determination. Specifically, a fracture of each sintered body was observed by an electron microscope. Arbitrary number of lines were drawn on the resulting SEM photograph and an average length of the intercept was determined. The accuracy was improved as the number of grains across the lines increased. Therefore, the number of lines drawn was determined in such a way that the lines crossed about 60 grains, although the number of lines was different depending on the grain size. The average grain size was estimated from the average length of the intercept. Also, the standard deviation σ was determined from the individual grain sizes used for estimating the average grain size, and the resulting σ was multiplied by 3 so as to determine 3σ.

Volume Resistivity

The measurement was performed in an air atmosphere at 400° C. by a method in conformity with JIS C2141. The test piece shape was specified to be 50 mm square×0.2 mm thick and the individual electrodes were made of silver in such a way that a main electrode had a diameter of 20 mm, a guard electrode had an inner diameter of 30 mm and an outer diameter of 40 mm, and an application electrode had a diameter of 40 mm. The applied voltage was specified to be 2 kV/mm, a current value 30 minutes after application of the voltage was read, and the volume resistivity was calculated from the resulting current value. Also, five test pieces of Experimental example 1 were prepared and the standard deviation of the volume resistivity at 400° C. thereof was determined.

Withstand Voltage

The test piece shape was specified to be 50 mm square× 0.2 mm thick. The withstand voltage of the test piece was measured in conformity with JIS C2110. Also, five test pieces of Experimental example 1 were prepared and the standard deviation of the withstand voltage thereof was determined.

Chemical Analysis

The Mg content was determined by inductively coupled plasma (ICP) emission spectrometry. In this regard, the lower limit of the measurement of the Mg content was 1 ppm. Meanwhile, the F content was determined by pyrohydrolysis separation-ion chromatography (JIS R9301-3-11). In this regard, the lower limit of the measurement of the F content was 10 ppm.

TABLE 1

| | Raw Material Powder | | | | Production Condition | | | |
|---|---|---|---|---|---|---|---|---|
| Experimental Example No. | $Al_2O_3$ Purity (%) | $MgO$[*1] Ratio by Mass | $MgF_2$[*2] Ratio by Mass | $CaO$[*3] Ratio by Mass | Forming Method | Degreasing (° C.) | Calcination (° C.) | Firing[*4] (° C.) |
| 1 | 99.99 | 0.1 | 0.09 | 0 | Gel casting | 550 | 820 | 1260 |
| 2 | 99.99 | 0.1 | 0.13 | 0 | Gel casting | 550 | 820 | 1260 |
| 3 | 99.99 | 0.1 | 0.2 | 0 | Gel casting | 550 | 820 | 1260 |
| 4 | 99.99 | 0.1 | 0.3 | 0 | Gel casting | 550 | 820 | 1260 |
| 5 | 99.99 | 0.2 | 0.09 | 0 | Gel casting | 550 | 820 | 1260 |
| 6 | 99.99 | 0.2 | 0.13 | 0 | Gel casting | 550 | 820 | 1260 |
| 7 | 99.99 | 0.2 | 0.2 | 0 | Gel casting | 550 | 820 | 1260 |
| 9 | 99.99 | 0.2 | 0.3 | 0 | Gel casting | 550 | 820 | 1260 |
| 9 | 99.99 | 0.3 | 0.09 | 0 | Gel casting | 550 | 820 | 1260 |
| 10 | 99.5 | 0.05 | 0 | 0.03 | Press forming | | 450 | 1620 |

| | Alumina Substrate (Sintered Body) | | | | | | |
|---|---|---|---|---|---|---|---|
| | Chemical Analysis | | Relative | Strength | Grain Size | | Volume Resistivity | Withstand Voltage |
| Experimental Example No. | Mg (%) | F (%) | Density | (MPa) | Average | 3σ | (Ωcm)[*5] | (kV/mm) |
| 1 | 0.09 | 0.03 | 0.998 | 380 | 1.5 | — | 5.1E+15 [0.12][*6] | 150 [0.03][*7] |
| 2 | 0.11 | 0.04 | 0.998 | 350 | 1.7 | — | 2.0E+15 [0.14] | 141 [0.03] |
| 3 | 0.14 | 0.06 | 0.998 | 340 | 10.0 | — | 8.0E+14 [0.21] | 135 [0.03] |
| 4 | 0.18 | 0.09 | 0.998 | 300 | 18.0 | — | 6.0E+14 [0.35] | 110 [0.04] |
| 5 | 0.15 | 0.03 | 0.998 | 380 | 1.0 | 1.5 | 3.4E+15 [0.16] | 160 [0.02] |
| 6 | 0.17 | 0.04 | 0.998 | 350 | 1.6 | 1.9 | 1.2E+15 [0.17] | 138 [0.03] |
| 7 | 0.20 | 0.06 | 0.998 | 320 | 8.0 | 15.2 | 7.0E+14 [0.25] | 130 [0.03] |
| 9 | 0.23 | 0.09 | 0.998 | 300 | 15.0 | 22.2 | 6.0E+14 [0.39] | 120 [0.04] |
| 9 | 0.21 | 0.03 | 0.996 | 390 | 1.0 | — | 5.5E+14 [0.73] | 95 [0.05] |
| 10 | 0.03 | 0 | 0.996 | 315 | 16.6 | 30.1 | 1.0E+14 [1.9] | 86 [0.08] |

[*1]Ratio of parts by weight of MgO to 100 parts by weight of $Al_2O_3$.
[*2]Ratio of parts by weight of $MgF_2$ to 100 parts by weight of $Al_2O_3$.
[*3]Ratio of parts by weight of CaO to 100 parts by weight of $Al_2O_3$.
[*4]The temperature is the maximum temperature during firing.
[*5]Volume resistivety at 400° C.
[*6]Value in square brackets [ ] is standard deviation (N = 5) of the volume resistivity at 400° C.
[*7]Value in square brackets [ ] is standard deviation (N = 5) of withstand voltage.

Experimental Examples 2 to 9

In Experimental examples 2 to 9, electrostatic chucks 10 were produced in the same manner as in Experimental example 1 except that the parts by mass of the MgO powder and the $MgF_2$ powder relative to 100 parts by mass of the $Al_2O_3$ powder were changed as shown in Table 1. Also, the characteristics of the alumina substrate 12 of each of Experimental examples 2 to 9 were measured in the same manner as in Experimental example 1. The results thereof are shown in Table 1.

Experimental Example 10

In Experimental example 10, an alumina substrate, in which an electrode was not buried, was produced. Initially, an $Al_2O_3$ powder having a purity of 99.5%, a MgO powder, and a CaO powder were mixed in such a way that the MgO powder was 0.05 parts by mass and the CaO powder was 0.03 parts by mass relative to 100 parts by mass of alumina. Polyvinyl alcohol (PVA) serving as a binder, water, and a dispersing agent were added to the resulting mixed powder, and mixing was performed for 16 hours with a trammel so as to produce a slurry. The resulting slurry was spray-dried by using a spray drier. Thereafter, the binder was removed by conducting holding at 450° C. for 5 hours so as to produce alumina granules of about 80 μm in average grain size. The resulting alumina granules were filled into a mold, and press forming was performed at a pressure of 200 kg/cm² so as to produce a compact. Subsequently, the resulting compact was set into a carbon sheath and was fired by using a hot-press firing method. The firing was performed in a pressurized nitrogen atmosphere (150 kPa) by raising a temperature at 300° C./h and conducting holding at 1,620° C. for 2 hours while a pressure of 100 kg/art was applied so as to produce an alumina sintered body. The thus obtained alumina sintered body was subjected to grinding so as to produce an alumina substrate having a diameter of 300 mm and a thickness of 6 mm. Various characteristics of the alumina substrate of Experimental example 10 were measured in the same manner as in experimental example 1. The results thereof are shown in Table 1.

Evaluation

In Experimental examples 1, 2, 5, and 6, alumina substrates having high volume resistivity of $1.0 \times 10^{15}$ Ω·cm or more at 400° C. and high withstand voltage of 130 kV/mm or more were obtained. Meanwhile, in the case where a plurality of test pieces of each of Experimental examples 1, 2, 5, and 6 were produced, the standard deviations of these characteristics were small values and, therefore, it was found that lot-to-lot variations were small. The average grain size of the alumina sintered grains was 1 to 2 μm, and 3σ (σ is standard deviation) of the grain size was 1 to 2 μm. In these experimental examples, the $Al_2O_3$ powder having a purity of 99.9% or more was used, and 0.1 to 0.2 parts by mass of MgO powder and 0.13 parts by mass or less of $MgF_2$ powder relative to 100 parts by mass of $Al_2O_3$ powder were used.

On the other hand, in each of Experimental examples 3, 4, 7, and 8, the amount of use of the $MgF_2$ powder serving as the sintering aid was large, so that grain growth proceeded excessively, and the average grain size of the alumina sintered grains was 8 μm or more and was too large. Therefore, the volume resistivity at 400° C. and the withstand voltage were reduced. In addition, lot-to-lot variations increased.

In Experimental example 9, the amount of use of the MgO serving as the grain growth inhibitor was large. Therefore, the average grain size of the alumina sintered grains was small, but the relative density did not increase, so that the volume resistivity at 400° C. and the withstand voltage were reduced. In addition, lot-to-lot variations increased.

In Experimental example 10, press forming rather than the gel casting method was adopted as the forming method and firing was performed at a high temperature. Therefore, the volume resistivity at 400° C. and the withstand voltage were reduced. In addition, lot-to-lot variations increased. The average grain size of the alumina sintered grains was more than 15 μm and 3σ was large. Consequently, it was found that the range of the grain size distribution increased.

Experimental examples 1, 2, 5, and 6 correspond to the examples according to the present invention, and the other Experimental examples correspond to the comparative examples.

The present application claims priority from Japanese Patent Application No. 2015-063671 filed on Mar. 26, 2015, the entire contents of which are incorporated herein by reference.

What is claimed is:

1. An alumina sintered body, containing 0.09 to 0.17 percent by mass of Mg element and 0.03 to 0.04 percent by mass of F element, and having a volume resistivity at 400° C. of $1.0 \times 10^{15}$ Ω·cm or more, a withstand voltage of 130 kV/m or more, an average grain size of 0.5 to 10 μm, and 3σ of the grain size of 1 to 20 μm, σ representing a standard deviation.

2. The alumina sintered body according to claim 1, having the average grain size of 1 to 2 μm and the 3σ of the grain size of 1 to 2 μm.

3. A method for manufacturing the alumina sintered body according to claim 1, comprising the steps of:
   (a) obtaining a compact by putting a slurry containing an $Al_2O_3$ powder, a MgO powder, a $MgF_2$ powder, a solvent, a dispersing agent, and a gelatinizer into a mold, gelatinizing the slurry by a chemical reaction of the gelatinizer in the mold, and causing mold release;
   (b) obtaining a calcined body by drying the compact, performing degreasing, and further performing calcination; and
   (c) obtaining a ceramic sintered body by subjecting the calcined body to hot-press firing at 1,150° C. to 1,350° C.,
   wherein in the step (a), the $Al_2O_3$ powder having a purity of 99.9 percent by mass or more is used and 0.1 to 0.2 parts by mass of the MgO powder and 0.13 parts by mass or less of the $MgF_2$ powder relative to 100 parts by mass of the $Al_2O_3$ powder are used in preparation of the slurry.

4. The method for manufacturing an alumina sintered body according to claim 3,
   wherein in the step (a), 0.09 to 0.13 parts by mass of the $MgF_2$ powder relative to 100 parts by mass of the $Al_2O_3$ powder are used in preparation of the slurry.

* * * * *